United States Patent
Nakata (10) Patent No.: US 9,288,133 B2
(45) Date of Patent: Mar. 15, 2016

(54) ROUTING DEVICE, COMMUNICATIONS SYSTEM, AND ROUTING METHOD

(75) Inventor: Tsuneo Nakata, Tokyo (JP)

(73) Assignee: NEC CORPORATION, Tokyo (JP)

(*) Notice: Subject to any disclaimer, the term of this patent is extended or adjusted under 35 U.S.C. 154(b) by 620 days.

(21) Appl. No.: 13/256,693

(22) PCT Filed: Mar. 26, 2010

(86) PCT No.: PCT/JP2010/002157
§ 371 (c)(1),
(2), (4) Date: Nov. 9, 2011

(87) PCT Pub. No.: WO2010/109895
PCT Pub. Date: Sep. 30, 2010

(65) Prior Publication Data
US 2012/0057464 A1    Mar. 8, 2012

(30) Foreign Application Priority Data

Mar. 27, 2009   (JP) .................................. 2009-079972

(51) Int. Cl.
| | |
|---|---|
| *H04L 12/701* | (2013.01) |
| *H04L 12/729* | (2013.01) |
| *H04L 12/707* | (2013.01) |
| *H04L 12/703* | (2013.01) |
| *H04L 12/723* | (2013.01) |

(Continued)

(52) U.S. Cl.
CPC .............. *H04L 45/00* (2013.01); *H04L 45/125* (2013.01); *H04L 45/22* (2013.01); *H04L 45/28* (2013.01); *H04L 45/50* (2013.01); *H04L 45/302* (2013.01); *H04W 40/12* (2013.01)

(58) Field of Classification Search
None
See application file for complete search history.

(56) References Cited

U.S. PATENT DOCUMENTS

| 7,242,679 B1 | 7/2007 | Cortez et al. |
| 7,561,517 B2 * | 7/2009 | Klinker ............... H04L 12/2602 370/229 |
| 8,165,156 B1 * | 4/2012 | Melsen ............... H04L 12/2881 370/466 |

(Continued)

FOREIGN PATENT DOCUMENTS

| JP | 2001251343 A | 9/2001 |
| JP | 2002009798 A | 1/2002 |

(Continued)

OTHER PUBLICATIONS

JP 2002-9798; Takashi Miyamura; Route Control System; Jan. 11, 2002.*

(Continued)

*Primary Examiner* — Chirag Shah
*Assistant Examiner* — Amar Persaud (57) ABSTRACT

A routing device of the present invention is included in a communication network capable of explicit routing which specifies resources included in a default path for each flow, and includes a detour path detection unit that detects a detour path which enables estimation of temporary transmission quality which can be provided to a flow within a detour region when at least a portion of an explicit default path of the flow transmitted by the routing device is detoured via resources included in a default path of another flow, and a routing unit that routes data of the flow at least to either one of the detour path and the default path, based on a difference between transmission quality of the detour path detected by the detour path detection unit and transmission quality of the default path.

18 Claims, 8 Drawing Sheets

(51) Int. Cl.
  *H04L 12/725* (2013.01)
  *H04W 40/12* (2009.01)

(56) References Cited

U.S. PATENT DOCUMENTS

| | | | |
|---|---|---|---|
| 2003/0076840 A1* | 4/2003 | Rajagopal | H04L 12/2602 370/395.21 |
| 2003/0133443 A1 | 7/2003 | Klinker et al. | |
| 2003/0165137 A1* | 9/2003 | Soloway | H04L 45/00 370/389 |
| 2006/0203720 A1* | 9/2006 | Kano | H04L 41/0663 370/228 |
| 2007/0047469 A1* | 3/2007 | Vasseur | H04L 45/02 370/255 |
| 2007/0115825 A1* | 5/2007 | Roberts | H04L 41/5019 370/235 |
| 2007/0133396 A1 | 6/2007 | Prehofer | |
| 2008/0130627 A1* | 6/2008 | Chen | H04L 45/02 370/351 |
| 2010/0278069 A1* | 11/2010 | Sharma | H04L 45/02 370/254 |
| 2012/0257617 A1* | 10/2012 | Bugenhagen et al. | 370/352 |

FOREIGN PATENT DOCUMENTS

| | | |
|---|---|---|
| JP | 2004248166 A | 9/2004 |
| WO | 2006/040198 A2 | 4/2006 |

OTHER PUBLICATIONS

International Search Report for PCT/JP2010/002157 mailed Apr. 20, 2010.

T. Miyamura et al., "A Study on Load Balancing Method with Explicit Routing in MPLS Netwosks", Technical Report of IEICE, SSE2000-54, Jun. 2000, pp. 25-30.

Wei Sun, "QoS Policy Constraint based routing", Internet Citation, Dec. 1999, XP002288847, Retrieved from the Internet:URL:http://www.cse.ohio-state.edu/jain/cis788-99/qos_routing/, [retrieved on Jul. 16, 2007], paragraph [0002]—paragraph [03.3], paragraph [0004]—paragraph [05.5], cited in EPSR.

Autenrieth A et al, "RD-QoS—the integrated provisioning of resilience and QoS in MPLS-based networks", Proceedings of IEEE International Conference on Communications, Apr. 28-May 2, 2002, NY, USA, IEEE, Piscataway, NJ, USA, vol. 2, Apr. 28, 2002, pp. 1174-1178, XP010589673, DOI:10.1109/ICC.2002.997035, ISBN: 978-0-7803-7400-3, the whole document, cited in EPSR.

The Extended European Search Report for EP Application No. 10755697.9 dated on Jan. 13, 2015.

* cited by examiner

| INPUT LABEL | OUTPUT LABEL | OUTPUT INTERFACE | QoS-LSP | TUNNEL ID |
|---|---|---|---|---|
| 50 | 51 | I | Yes | 1 |
| 60 | 61 | J | Yes | 2 |
| 70 | 71 | K | Yes | 3 |

FIG. 4

| INPUT DESTINATION ID \ RECEIVING TUNNEL ID | 1 | 2 | 3 |
|---|---|---|---|
| 1 | 0 | -2 | Null |
| 2 | 2 | 0 | Null |
| 3 | Null | Null | 0 |

FIG. 5

| INPUT LABEL | OUTPUT LABEL | OUTPUT INTERFACE | QoS-LSP | TUNNEL ID |
|---|---|---|---|---|
| 52 | 53 | S | Yes | 1 |
| 64 | 65 | T | Yes | 2 |

FIG. 6

| RECEIVING TUNNEL ID / INPUT DESTINATION ID | 1 | 2 |
|---|---|---|
| 1 | O | Null |
| 2 | Null | O |

ROUTING DEVICE, COMMUNICATIONS SYSTEM, AND ROUTING METHOD

TECHNICAL FIELD

The present invention relates to a routing device, a communication system, and a routing method.

BACKGROUND ART

In a communication network capable of providing communications with guaranteed quality of service (hereunder, referred to as QoS) at a certain level or above, in order to guarantee a QoS in an actual flow transmission, it is necessary to reserve communication resources with guaranteed QoS so that the flow transmission can occupy the communication resources. This reservation is performed through, for example, a signaling mechanism such as signaling system No. 7 (SS7) in a telephone network and RSVP in an IP network. These types of conventional resource reservation signaling mechanisms control reservations for any resources so that even if all of the flows which use these resources use the entire reserved amount of the resources at the same time, these resources will not be too insufficient for a QoS guarantee to be assured.

However, in general, a flow which reserves QoS does not always constantly use all of the reserved bandwidth. For example, in those cases where the transmission process of the flow has stopped, or where the communication network has not received an amount of load for which the entire reserved resources are required, all of the reserved resources are not in use. At this time, regarding the excess resources, in those cases where these resources are exclusively reserved by a conventional signaling mechanism, resource utilization efficiency cannot be optimized as they cannot be used for another flow transmission.

As a countermeasure for this problem, there is a commonly known technique with a configuration such that when a flow is not using all of the reserved QoS resources, another flow can use the resources (for example, refer to Non-Patent Document 1). In Non-Patent Document 1, there is disclosed a technique such that in a load distribution scheduling of a link to be shared by two flows, when a minimum bandwidth is guaranteed for both flows and either one of the flows is using the minimum bandwidth or less for its bandwidth, the ratio of load distribution is dynamically changed so that the other flow can use this bandwidth.

In the technique of Non-Patent Document 1, a plurality of flows practically share a reserved bandwidth with each other to thereby realize effective utilization of available bandwidth. However, bandwidth can be shared with each other using this technique only when these plurality of flows have reserved a bandwidth of the same resources. In this case, a combination of flows which can share a bandwidth is determined by the routing of each flow.

Prior Art Document

Non-Patent Document

[Non-Patent Document 1] Masayoshi Shimamura, Katsuyoshi Lida, Hiroyuki Koga, Youki Kadobayashi and Suguru Yamaguchi, "Provisioning algorithm for minimum throughput assurance service in VPNs using nonlinear programming," LEICE Technical Report, 1N2007-83, pp. 35-40, October 2007

SUMMARY OF THE INVENTION

Problem to be Solved by the Invention

Figure 11:
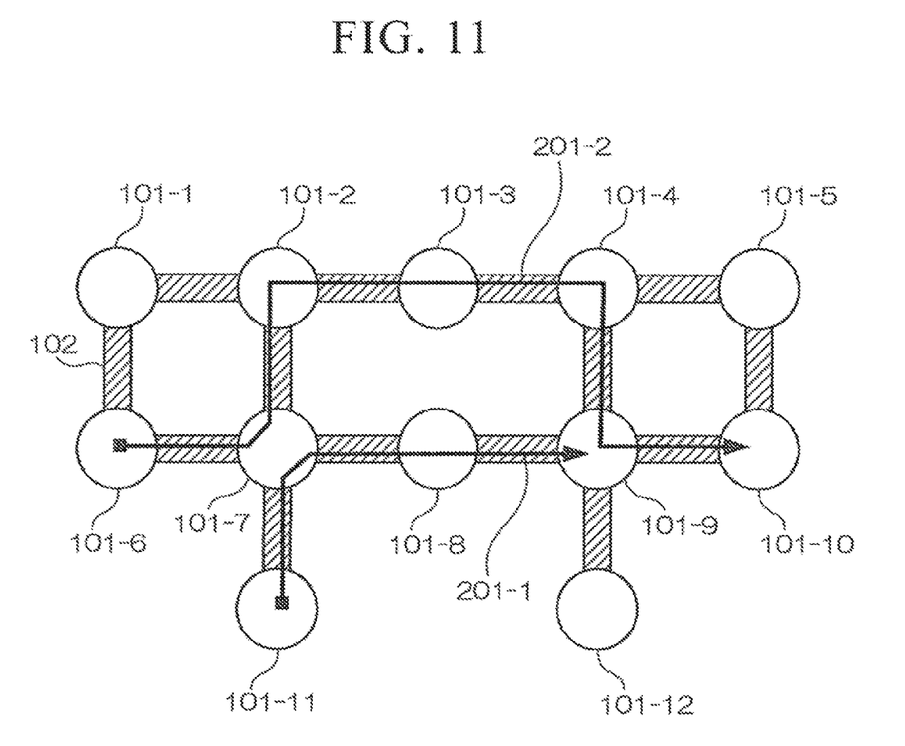
FIG. 11 is a conceptual diagram for describing explicit routing used in MPLS, GMPLS, and the like, performed by means of related techniques.

In explicit routing used for MPLS (multiprotocol label switching), GMPLS (generalized multiprotocol label switching), and the like, which take traffic engineering into consideration, routing of each flow may not take the shortest path in some cases. FIG. 11 shows an example in this type of case. In FIG. 11, a communication link 102 which connects between two communication nodes 101 has a bandwidth r. Moreover, a flow 201-1 from communication node 101-11 to communication node 101-9, and a flow 201-2 from communication node 101-6 to communication node 101-10, respectively reserve an end-to-end bandwidth only by r.

The shortest path for the flow 201-2 is a path via communication node 101-7, communication node 101-8, and communication node 101-9. However, in the link between communication node 101-7 and communication node 101-8, and the link between communication node 101-8 and communication node 101-9, the bandwidth is entirely occupied by another flow 201-1, and therefore, this path cannot be used. As a result, a path, which is a longer path via communication node 101-7, communication node 101-2, communication node 101-3, communication node 101-4, and communication node 101-9 is assigned to the flow 201-2. In this type of case, the flow 201-1 and flow 201-2 do not share communication links, and therefore, mutual bandwidth sharing by means of the technique disclosed in Non-Patent Document 1 cannot be carried out.

At this time, if the routing of the shortest path via communication node 101-7, communication node 101-8, and communication node 101-9 is set for the flow from communication node 101-7 to communication node 101-9 to be transmitted without performing resource reservation, the flow without resource reservation is shorter than the flow 201-2, which reserves end-to-end resources between the same origin-destination nodes.

Accordingly, in a case, for example, where the load of the flow 201-1 is low and no congestion is occurring in the link between communication node 101-7 and communication node 101-8 and the link between communication node 101-8 and communication node 101-9, then regarding the communication from communication node 101-7 to communication node 101-9, the flow which has reserved resources takes a path longer than that of the flow which did not reserve resources, and hence it has a greater delay. That is to say, there is a problem in that although resource reservation is performed for a QoS guarantee, even the QoS becomes deteriorated in some situations.

The present invention takes into consideration the above circumstances, with an object of providing a routing device, a communications system, and a routing method in which transmission performance at a level higher than that of a default path can be provided for a flow for which the default path is determined by explicit routing, and furthermore, resources can be effectively reused.

Means for Solving the Problem

In order to solve the above problems, a routing device of the present invention is included in a communication network capable of explicit routing which specifies resources included in a default path for each flow, and includes a detour path detection unit that detects a detour path which enables estimation of temporary transmission quality which can be provided to a flow within a detour region when at least a portion of an explicit default path of the flow transmitted by the routing device is detoured via resources included in a default path of another flow, and a routing unit that routes data of the flow at least to either one of the detour path and the default path, based on a difference between transmission quality of the detour path detected by the detour path detection unit and transmission quality of the default path.

Moreover, in order to solve the above problems, a communications system of the present invention includes a routing device included in a communication network capable of explicit routing which specifies resources included in a default path for each flow. The routing device includes a detour path detection unit that detects a detour path which enables estimation of temporary transmission quality which can be provided to a flow within a detour region when at least a portion of an explicit default path of the flow transmitted by the routing device is detoured via resources included in a default path of another flow, and a routing unit that routes data of the flow at least to either one of the detour path and the default path, based on a difference between transmission quality of the detour path detected by the detour path detection unit and transmission quality of the default path.

Furthermore, in order to solve the above problems, a routing method of the present invention is included in a communication network capable of explicit routing which specifies resources included in a default path for each flow, and includes the steps of detecting a detour path which enables estimation of temporary transmission quality which can be provided to a flow within a detour region when at least a portion of an explicit default path of the flow transmitted by a routing device is detoured via resources included in a default path of another flow, and routing data of the flow at least to either one of the detour path and the default path, based on a difference between transmission quality of the detected detour path and transmission quality of the default path.

Effect Of The Invention

According to the present invention, there can be achieved advantages such that it is possible to provide, to a flow with a default path defined by explicit routing, higher transmission performance than the default path according to the situation, and furthermore, resources can be reused effectively.

EMBODIMENTS FOR CARRYING OUT THE INVENTION

Hereunder, a first exemplary embodiment of the present invention is described, with reference to drawings.

A. Principle of Exemplary Embodiments of the Present Invention

A brief overview of the principle of exemplary embodiments of the present invention is described.

In the exemplary embodiments of the present invention, a detour path which enables estimation of transmission quality which can be temporarily provided to a detour region is dynamically detected when at least a portion of resources explicitly included in a default transmission path of a flow is detoured using the resources included in a default path of another flow, and data of the flow is temporarily routed to the detour path or the default path according to a difference in the temporary transmission quality within the detour region between the detected detour path and the default path.

The estimation result of the transmission quality which can be temporarily provided to a specific flow with regard to the detour path detected here is used only for path selection determination in the effective period thereof. The criterion for path selection determination is as follows. Data of the flow is routed to the detour path only in those cases where either one or both of improvement in transmission quality and reduction in transmission cost are expected to occur as a result of utilizing the detour path for the data transmission of the flow.

A detour path which enables estimation of transmission quality which can be temporarily provided to a flow A can be detected based on, for example, explicit routing information of another flow. If a flow B is QoS guaranteed end-to-end and it shares two or more of routing devices with the explicit path of the flow A, the region between the shared routing devices can be detected as a detour path which enables estimation of transmission quality. In a case where one of the QoS resources included in the detour path of the flow A reserved by the flow B is taken as a flow C, hereunder, the flow B is referred to as a guest flow of the flow C, and the flow A is referred to as a primary flow of the flow C. Several primary flows and guest flows may exist for the same resources. In the exemplary embodiments of the present invention, the routing device is not limited to an independent hardware entity, and it may be applied to a network or the like between processors on a single chip.

For example, in a case where a certain QoS resource guarantees FIFO properties and a transmission delay of no more than x for the primary flow, when the primary flow of this resource is absent, or at the moment when the primary flow is present but no data transmission load is applied, data of the guest flow can also be transmitted with a transmission delay of no more than x. The reason for the occurrence of a state where data transmission load is not present may be considered to be that the transmission process of the flow is not actually transmitting data, or although the transmission process transmitting data, any of the relay processes, by means of the exemplary embodiment of the present invention, is performing relay using a detour path which detours the resources thereof.

Moreover, in a case where a highly precise performance estimation mechanism such as the one described in Reference A (T. Nakata et al., "Efficient bundling of heterogeneous radio resources for broadband Internet access from moving vehicles," in proceedings of Global Mobile Congress 2004, Oct. 11-13 2004, Shanghai, China) is being applied in a path other than the default path between two or more routing devices on the default path, this path may be detected as a detour path which enables estimation of temporary transmission quality.

Furthermore, even without a path which includes QoS resources only, or a path with a highly precise performance estimation mechanism being applied thereto, in those cases where, for example, two routing devices on the default path are linked by a single link outside the default path, and performance can be estimated with the routing device on the transmitting side based on transmission rate and queue length, this link may be detected as a detour path which enables estimation of temporary transmission quality.

In a case where, based on the estimation precision of transmission performance of the detour path, the performance value is expected to be higher with use of the detour path, but the QoS guarantee is determined as being imperfect with respect to the QoS flow, the same data is transmitted to the detour path and to the portion of the default path to be detoured to the detour path, to thereby maintain the QoS guarantee while improving the expected value of the performance.

In this manner, in the exemplary embodiments of the present invention, it is possible to provide, to the flow with a default path defined by explicit routing, higher transmission performance than that of the default path according to the situation. Furthermore, in a case where the QoS flow selects a detour path, if the detour target portion of the default path is provided to another guest flow, QoS resources can be reused effectively.

A. First Exemplary Embodiment

A first exemplary embodiment of the present invention is described.

In the following description, it is necessary that explicit routing is possible, however, there are no particular limitations on the means for realizing it. In the first exemplary embodiment of the present invention, there is described a case of realizing explicit routing by means of MPLS and RSVP-TE (resource reservation protocol with traffic extensions), which are commonly known techniques.

Figure 1:
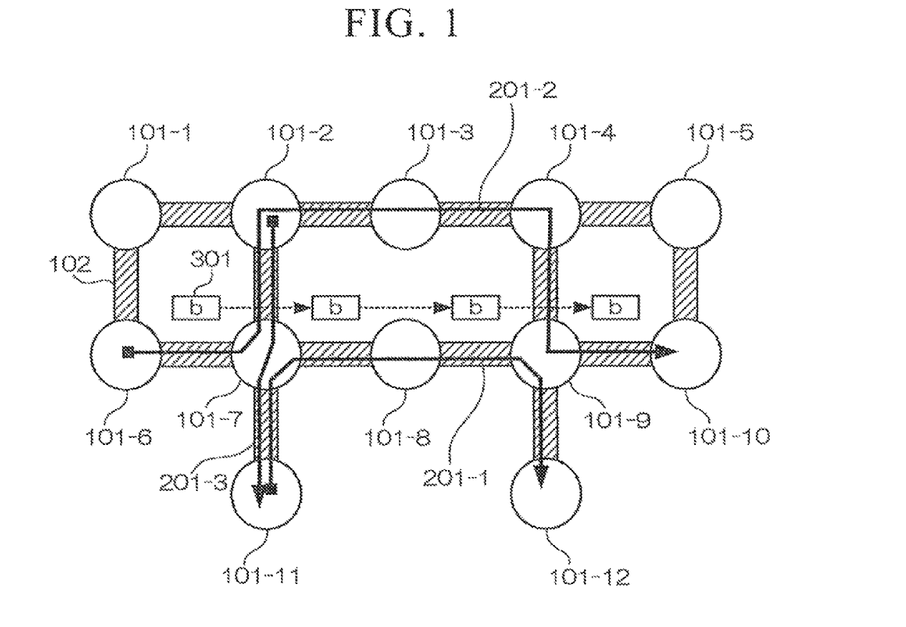
FIG. 1 is a conceptual diagram for describing a routing method according to a first exemplary embodiment of the present invention.

FIG. 1 is a conceptual diagram for describing a routing method according to this first exemplary embodiment. In FIG. 1, communication nodes 101-1, 101-2, to 101-12 are all label switch routers (hereunder, referred to as LSR). With bandwidth reservation signaling using RSVP-TE, a QoS guaranteed LSP (label switch path: referred to as QoS-LSP) 201-1 from LSR101-11 to LSR101-12, a QoS-LSP201-2 from LSR101-6 to LSR101-10, and a QoS-LSP201-3 from LSR101-2 to 101-11 are set.

Links 102 between LSRs all have a bandwidth "1" in both directions, and QoS-LSP 201-1, 201-2, and 201-3 all reserve a bandwidth "1". LSRs shared by a plurality of LSPs including QoS-LSP are referred to as node LSRs. Each QoS-LSP is an origin or node LSR, and accepts a packet input.

Each of QoS-LSR101-1 through 101-12 records a route LSR list and tunnel ID of each of QoS-LSP201-1 through 201-3 when performing signaling with RSVP-TE. At this time, each of QoS-LSR101-1 through 101-12, if a node LSR common with another LSP routed through the local node is present on the downstream side of the local node, these paths are registered as LSPs which can perform the transmission process on behalf of each other.

For example, node LSR101-7 shared by QoS-LSP201-1, 201-2, and 201-3 registers LSR101-9 as an LSR capable of performing the transmission process for QoS-LSP201-1 and 201-2 on behalf of each other, since LSR101-9 also belongs to both QoS-LSP201-1 and 201-2. This procedure is an example of a mechanism for dynamically detecting a detour path which enables transmission quality comparison. That is to say, if QoS-LSP201-1 is established first, QoS-LSP201-1 has a detour path between LSR101-7 and LSR101-9 for the first time when QoS-LSP201-2 is established.

In a case where when a packet of the primary flow of QoS-LSP201-2 is received, the QoS value is expected to be higher with transmission performed using the detour path QoS-LSP201-1 in the path to node LSR101-9 on the downstream side which belongs to both QoS-LSP201-1 and 201-2, rather than with the default path QoS-LSP201-2, and transmission performed in this manner is determined as not becoming a problem with QoS guarantee, the node LSR101-7 inputs this packet to QoS-LSP201-1 as a guest flow packet (referred to as guest packet).

Meanwhile, at node LSR101-9, the guest packet of QoS-LSP201-1 is input to QoS-LSP201-2 again since the detour region ends. That is to say, node LSR101-9 needs to determine a QoS-LSP for indentifying and transmitting the guest packet among the packets received from QoS-LSP201-1. In order to enable this type of identification, in this first exemplary embodiment, when LSR101-7 inputs a packet from QoS-LSP201-2 to QoS-LSP201-1, information which indicates that this packet is input from QoS-LSP201-2 and it should return to QoS-LSP201-2 at node LSR101-9, is inserted to the header.

This is realized in a manner such that, for example, a tunnel ID of QoS-LSP201-2 and a SIM header (referred to as guest SIM header) including an output schedule LSR are newly created, the SIM header of QoS-LSP201-2 is changed to a guest SIM header, a normal SIM header of QoS-LSP201-1 is stacked thereon, and this is treated as the SIM header of the transmission packet.

At this time, the S bit of the normal SIM header of QoS-LSP201-1 is turned to "0 (which indicates stacking being performed)".

The guest SIM header is configured as follows for example. As one method, a guest SIM header is configured such that the EXP field and TTL field are given a specific value so that they can be distinguished from a normal SIM header, and a tunnel ID and identification information of the LSR at which a detour region ends are included in the label field. Alternatively, a guest SIM header may also be configured in a manner such that a specific label which indicates it is a guest SIM header is inserted to the label field, and a separate field is prepared for storing a tunnel ID and identification information of an output schedule LSR.

For a packet from the QoS-LSP which provides a detour path ending at the own node, the node LSR checks the stacked regression SIM header to thereby identify a guest packet which should return to the default path. Moreover, an LSR other than the node LSRs inspects only the leading SIM header, and the leading SIM header does not become a guest SIM header. Therefore, LSRs other than node LSR do not have to be able to interpret the guest SIM header.

Figure 2:
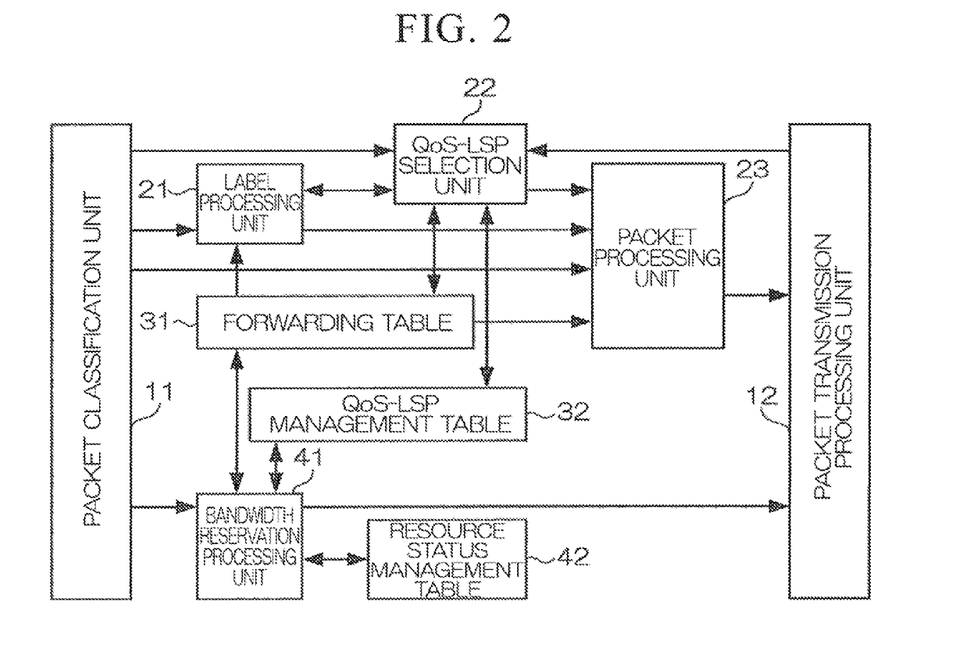
FIG. 2 is a block diagram showing a configuration of a node LSR for realizing operations, according to the first exemplary embodiment of the present invention.

Next, FIG. 2 is a block diagram showing a configuration of a node LSR for realizing the above described operation, according to the first exemplary embodiment of the present invention. In FIG. 2, a packet classification unit 11 classifies a received packet 301 (packet b) in relation to the label. The packet classification unit 11 supplies the packet 301 to a label processing unit 21 if the packet 301 is a labeled packet or a packet which needs a new label added thereto, and it supplies the packet 301 to a packet processing unit 23 in any other cases.

The label processing unit 21 makes reference to the label of the input packet 301 and a forwarding table 31 described later, and determines whether or not the LSP (including the QoS-LSP) which is transmitting the received packet is a target LSP for performing proxy transmission by the QoS-LSP. The label processing unit 21 supplies information of the packet 301 to a QoS-LSP selection unit 22 if the LSP is a target LSP for performing proxy transmission by the QoS-LSP, and it supplies information of the packet 301 to the packet processing unit 23 if the LSP is not a target LSP for performing proxy transmission.

The QoS-LSP selection unit 22 extracts, from the SIM header of the received packet 301 and the forwarding table 31, the tunnel ID of the QoS-LSP corresponding to the received packet. The QoS-LSP selection unit 22 makes reference to the extracted tunnel ID and a QoS-LSP management table 32 described later, and selects a QoS-LSP of the minimum metric which enables an input of the received packet. If the metric of the selected input destination QoS-LSP is smaller than the QoS-LSP of the reception origin, the QoS-LSP selection unit 22 inputs the received packet as a guest packet to the input destination QoS-LSP, and otherwise, it does not change the LSP to be used for transmission and supplies the packet to the packet processing unit 23 without making any changes thereto.

The forwarding table 31 manages input labels, flags which indicate whether or not the LSP corresponding to the input label is a QoS-LSP, and tunnel Ds of respective LSPs. The QoS-LSP management table 32 manages merits with regard to the respective QoS-LSPs which pass through the LSR, in those cases where the packet received from another LSP is input as a guest packet.

The packet processing unit 23 processes the received packet according to the QoS-LSP selected by the QoS-LSP selection unit 22, and supplies it to a packet transmission processing unit 12.

A bandwidth reservation processing unit 41 makes reference to a resource status management table 42 and reserves bandwidth. The resource status management table 42 maintains a resource status. The packet transmission processing unit 12 transmits a received packet as a guest packet or as a normal MPLS packet.

Figure 3:
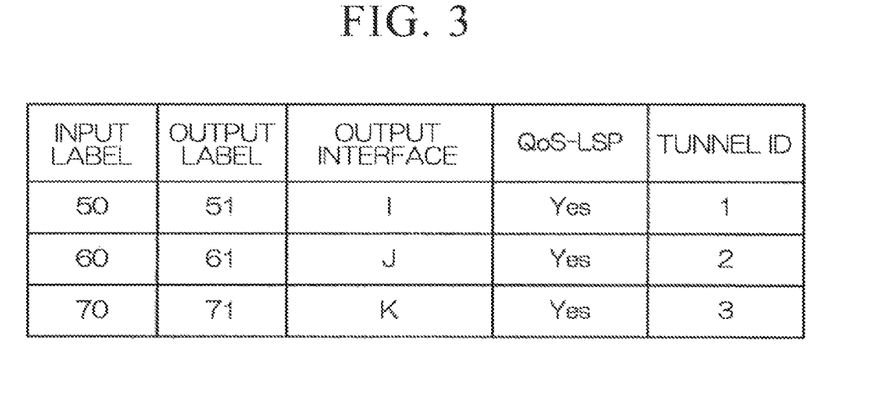
FIG. 3 is a conceptual diagram showing a data configuration example of an LSR forwarding table, according to the first exemplary embodiment of the present invention.

FIG. 3 is a conceptual diagram showing a data configuration example of the forwarding table 31 of LSRI01-7 according to this first exemplary embodiment. The forwarding table 31 manages input labels, flags which indicate whether or not the LSP corresponding to the input label is a QoS-LSP, and tunnel IDs of respective LSPs.

Figure 4:
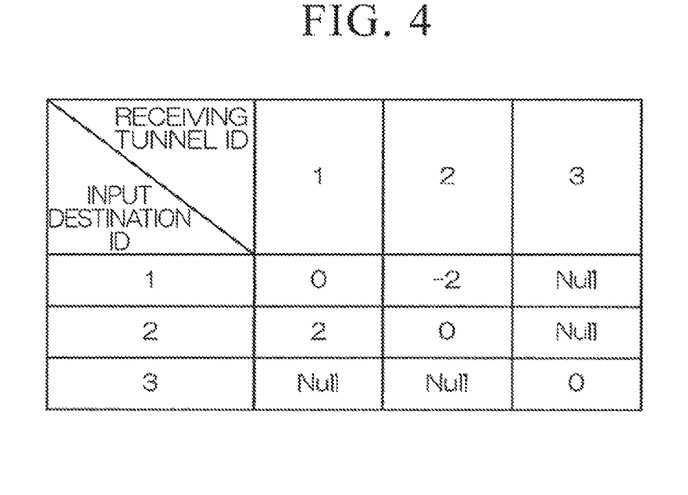
FIG. 4 is a conceptual diagram showing a data configuration example of an LSR QoS-LSP management table, according to the first exemplary embodiment of the present invention.

FIG. 4 is a conceptual diagram showing a data configuration example of the QoS-LSP management table 32 of LSR101-7 according to this first exemplary embodiment. The QoS-LSP management table 32 manages merits with regard to the respective QoS-LSP which passes through the LSR in those cases where the packet received from another LSP is input as a guest packet. More specifically, the QoS-LSP management table 3 manages QoS metric differences with regard to respective combinations of a receiving tunnel and input destination tunnel in those cases where an input is performed and where the input is not performed.

Next, as a process operation of nodes LSR101-7 and 101-9, the process of node LSR101-7 at the time of packet reception is described. The received packet 301 is classified with regard to the label by the packet classification unit 11 of the node LSR101-7, and is input to the label processing unit 21 if the packet is a labeled packet or it is a packet to which a new label should be added. The label processing unit 21 makes reference to a forwarding table 31 with the label of the input packet 301, and determines whether or not the LSP (including the QoS-LSP) which is transmitting the received packet is a target LSP for performing proxy transmission by the QoS-LSP. The label processing unit 21 inputs information of the packet 301 to a QoS-LSP selection unit 22 if the LSP is a target LSP for performing proxy transmission by the QoS-LSP, and it inputs information of the packet 301 to the packet processing unit 23 if the LSP is not a target LSP for performing proxy transmission.

Hereunder, there is described a case where a packet 301 which does not include a guest SIM header is received from LSP201-2. Information of the received packet 301 is input to the QoS-LSP selection unit 22. The QoS-LSP selection unit 22 extracts, from the SIM header of the received packet 301 and the forwarding table 31, the tunnel ID of the QoS-LSP corresponding to the received packet.

Next, the QoS-LSP selection unit 22 makes reference to the QoS-LSP management table 32 using the extracted tunnel ID, and selects a QoS-LSP of the minimum metric which enables an input of the received packet. If the metric of the selected input destination QoS-LSP is smaller than the QoS-LSP of the reception origin, the QoS-LSP selection unit 22 inputs the received packet as a guest packet to the input destination QoS-LSP, and otherwise, it does not change the LSP to be used for transmission and transmits the packet according to the leading SIM header. Here, it is preferable that the metric be the smallest possible.

In the QoS-LSP management table 32, as shown in FIG. 4, input merits are expressed as matrix elements between reception channel IDs and input destination tunnel IDs. Here, the tunnel ID of QoS-LSP201-1 is "1", and the tunnel ID of QoS-LSP201-2 is "2". Moreover, in a case where the transmission process cannot be performed on behalf of each other, the QoS metric difference is NULL. The metric difference also becomes NULL in those cases where it is determined that the QoS guarantee of the primary flow at the own node becomes imperfect or the QoS guarantee of a QoS-LSP other than the own node may become imperfect if a guest packet input is made.

The QoS metric is given by, for example, the number of hops to a node on the downstream side, the sum of the delay upper limit values of respective hops, the sum of the upper limit values of error possibility, and the minimum value of the remaining battery level. An LSR adds a row and column corresponding to the QoS-LSP management table 32 every time when a management target QoS-LSP is added by RSVP-TE signaling. Furthermore, it updates the metric difference on the QoS-LSP management table 32 every time when the metric of any QoS-LSP is changed.

In the example shown in FIG. 4, the number of hops is set as a metric. If the packet of QoS-LSP201-2 is transmitted by QoS-LSP201-1, the end-to-end hop number is reduced by "2", and accordingly, the metric difference of the input destination tunnel ID=1 is "−2" with respect to the receiving tunnel ID=2. Accordingly, since the metric difference is less than "0", the packet 301 received from QoS-LSP201-2 (refer to FIG. 1) is input to QoS-LSP201-1.

At this time, the QoS-LSP selection unit 22 performs the following operation. First, the SIM header of the received packet 301 (the SIM header of QoS-LSP201-2) is changed to a guest SIM header corresponding to QoS-LSP201-2, and a SIM header corresponding to the transmission by QoS-LSP201-1 (from FIG. 3, the transmission label is "51") is stacked thereon, to be input to the packet transmission processing unit 11.

Figure 5:
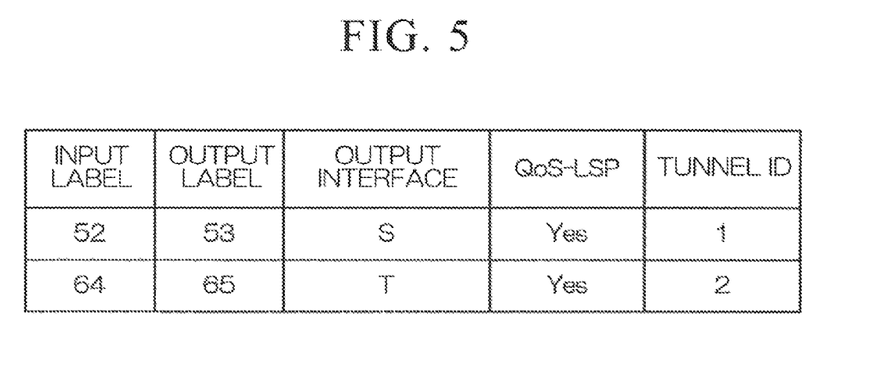
FIG. 5 is a conceptual diagram showing a data configuration example of an LSR forwarding table, according to the first exemplary embodiment of the present invention.
Figure 6:
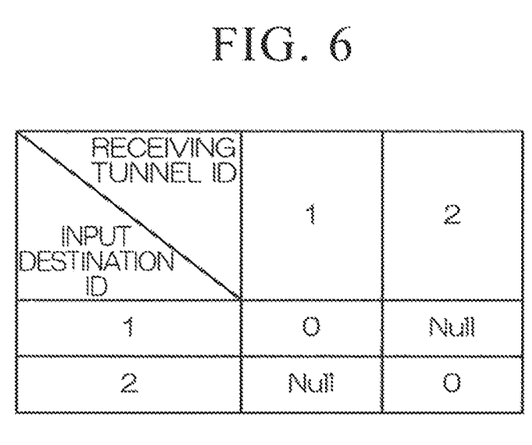
FIG. 6 is a conceptual diagram showing a data configuration example of an LSR QoS-LSP management table, according to the first exemplary embodiment of the present invention.

FIG. 5 is a conceptual diagram showing a data configuration example of the forwarding table 31 of node LSR101-9, according to this first exemplary embodiment. FIG. 6 is a conceptual diagram showing a data configuration example of the QoS-LSP management table 32 of node LSR101-9, according to this first exemplary embodiment.

At node LSR101-9, the packet 301 including a guest SIM header received from QoS-LSP201-1 is first inspected for the guest SIM header at the QoS-LSP selection unit 22. As a result, at the QoS-LSP selection unit 22, the LSP which is the default path of this packet is determined as being QoS-LSP201-2. Furthermore, in a case of using identification information of the LSR at which the detour region ends, the QoS-LSP selection unit 22 inspects whether or not the detour region ends at the own node. If the detour region of the packet 301 ends at the own node, the packet 301 is input to QoS-LS P201-2.

With the above operation, bandwidth sharing between QoS-LSPs becomes possible. Here, in order for this to happen, a precondition is that it is possible to determine whether or not the QoS guarantee of the primary flow becomes imperfect when LSR101-7 inputs a guest packet. The method for this determination is described below.

First, it is necessary that at the LSR serving as the origin of the detour path, based only on the status information of the own node, it is possible to determine whether or not there is a possibility of a problem occurring in the QoS guarantee to be provided by the own node to the primary flow of QoS-LSP (Y) even if a packet of maximum size which can be received from QoS-LSP (X) is input to QoS-LSP (Y) of the detour destination. For example, if the QoS guarantee which the own node should provide to the primary flow of QoS-LSP (Y) is the upper limit value of the transmission delay, it is necessary that it is possible, based on the queue length of the output buffer and the amount of transmission per unit time, and the like, to determine that the delay at the own node does not exceed the guaranteed value even if a packet of QoS-LSP (X) of the receivable maximum size is transmitted from QoS-LSP (Y).

This type of determination is valid based on the premise that end-to-end QoS is maintained by guaranteeing local QoS assigned to each node. The above determination for a QoS-LSP which does not meet this premise always yields a negative determination result. In this first exemplary embodiment, it is assumed that at the time of RSVP-TE signaling each LSR receives a local QoS request by which end-to-end QoS is maintained as long as all LSRs on the path guarantee a local QoS request. Local determination described above is referred to as a local condition, and it can be generalized as follows.

(Local Condition)

The own node is to be able to maintain a QoS guarantee condition requested at the time of QoS-LSP setting even if a guest packet is input to the QoS-LSP.

Furthermore, in addition to confirmation of the above local condition, it is necessary to determine whether or not an input of the packet of the primary flow of QoS-LSP (X) as a guest packet to the QoS-LSP (Y) causes the local QoS guarantee other than at the own node to become imperfect. Specifically, this is achieved by determining whether or not the destination node of any detour path with respect to the primary flow of QoS-LSP (Y), which is present between the own node on QoS-LSP (Y) or a node on the upstream side thereof, and the destination node of the detour path by QoS-LSP (Y) of QoS-LSP (X) or a node on the upstream side thereof, can maintain the local QoS guarantee even if the own node inputs a guest packet to QoS-LSP (Y).

Figure 7:
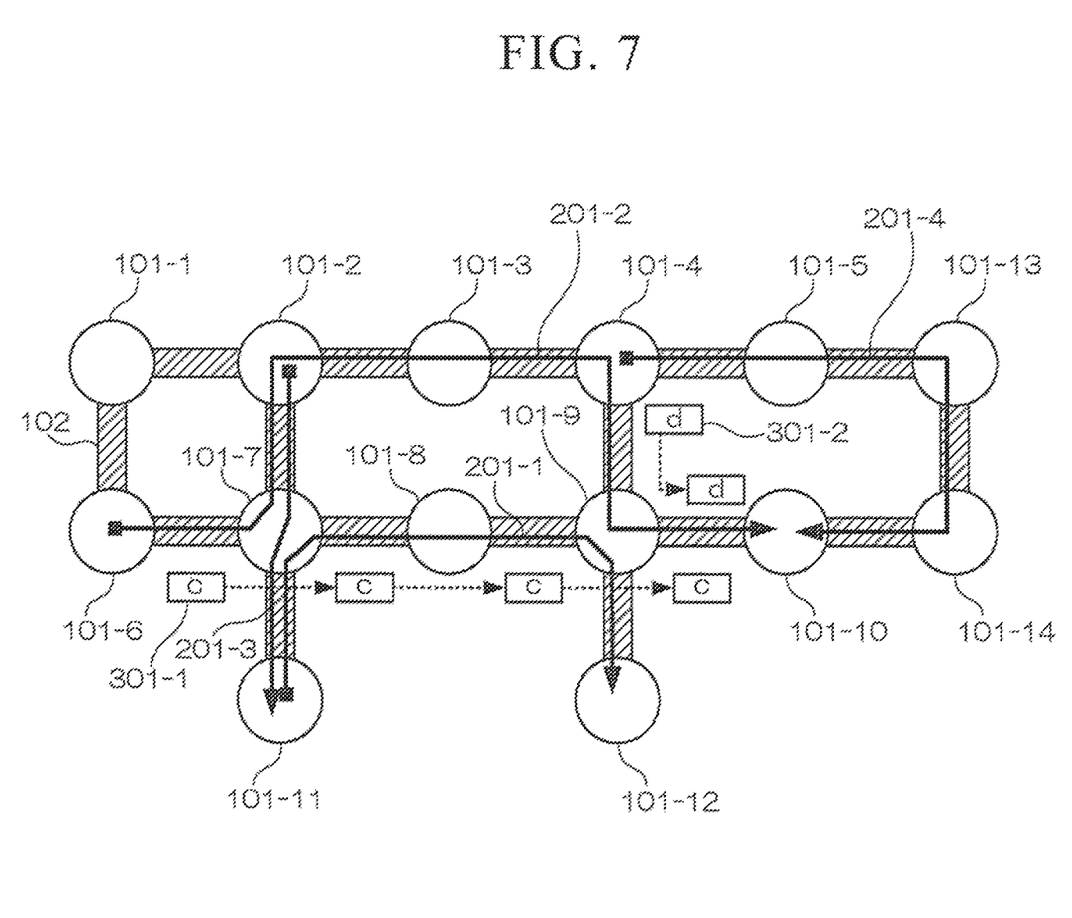
FIG. 7 is an explanatory diagram for describing a reason for a determination being required.

FIG. 7 is an explanatory diagram for describing a reason for the above described determination being required. The example shown in FIG. 7 includes, in addition to the example shown in FIG. 1, QoS-LSP201-4 in which LSR101-4 is taken as a point of origin and LSR101-10 is taken as a point of destination. In this example, in addition to nodes LSR101-7 and 101-9, LSR101-4 and 101-10 are taken as a node LSR. Now, provided that the load on QoS-LSP201-1 is almost none, a packet c (packet 301-1) of QoS-LSP201-2 is transmitted at node LSR 101-7 mostly to QoS-LSP201-1, and as a result, the packet of QoS-LSP201-2 is hardly transmitted to LSR101-2, 101-3, and 101-4.

At this time, the load on QoS-LSP201-2 may be determined as being almost none at node LSR101-4, and a packet d (packet 301-2) of QoS-LSP201-4 may be input as a guest packet to QoS-LSP201-2 in some cases. In this case, if the packet c and the packet d converge between LSR101-9 and LSR101-10, and the total rate exceeds the reserved bandwidth of QoS-LSP201-2, there occurs the possibility of congestion.

Therefore, in order to confirm whether or not the local QoS guarantee other than at the local node may become imperfect if the packet d is input as a guest packet to QoS-LSP201-2, it is necessary to be able to determine whether or not there is a possibility that the packet of the primary flow of QoS-LSP201-2 converges on the downstream side of the own node. The criterion for this type of determination for avoiding the possibility of convergence on the further downstream side may be generalized as a global condition as follows.

(Global Condition)

On a QoS-LSP capable of providing a detour path which originates at the own node, the destination node of any detour path of the primary flow of the QoS-LSP between the own node or a node on the upstream side thereof, and the destination node of the detour path or a node on the upstream side thereof, is able to maintain the local condition even if a guest packet is input to the QoS-LSP.

There may be considered several methods for confirming this condition. For example, the respective QoS-LSPs are first made to notify each node LSR on the path of a list of destination LSRs of all possible detour paths which may be taken by the primary flow. When a packet S received from an LSP (A) at a certain node W is input as a guest packet to a QoS-LSP (B), as long as the origin node, or an LSR, which is on the downstream side of the LSP (W) and closest to the LSP (W), of the destination LSR of the detour path of the primary flow of QoS-LSP (B) on the further upstream side, is on the upstream side of the destination LSR of the detour path for the packet S, which originates at the LSP (W), there is a possibility that the packet S and the packet of the primary flow of QoS-LSP (B) may converge at the destination LSR and congestion may occur.

Taking the above circumstances into consideration, as long as LSP, which is the destination LSR of the detour path of the primary flow of QoS-LSP (B) in which the origin node is at LSP (W) or is on the further upstream side thereof, and is closest to LSP (W), is at or on the downstream side of the destination LSR of the detour path of the packet S, the input of the packet S as a guest packet to QoS-LSP (B) does not influence the QoS of QoS-LSP (B) even at any LSR on the downstream side of LSP (W). Therefore, the global condition may be considered as being satisfied. In order to use this determination method, each QoS-LSP needs to notify to the node LSRs on the path, the information of the destination LSR of possible detour paths which may be taken by the primary flow.

In a case where there is no node LSR between the destination LSR and LSP (W) of the detour path for the packet S, the global condition is satisfied regardless of the detour path of the primary flow of QoS-LSP (B).

The global condition may also be confirmed in a manner such that when performing packet transmission to the detour path, signaling information, which indicates that this packet does not use the default path until a destination node of the detour path is reached, is transmitted to the default path at the same time. Having received this, the QoS-LSR is able to know that it has a capacity for a guest packet input as much as the load for the detouring packet, until the destination node of the detour path of the detouring packet.

In those cases where the local condition and global condition described above are not satisfied, the metric difference used for path selection becomes NULL. Since the local condition and global condition both depend on the transmission status of the primary flow of the detour destination LSP, even if the conditions are satisfied at some point, it is not possible at another time to estimate whether the conditions are satisfied. Therefore, reading of the metric difference corresponds to estimation of the difference in the temporary transmission quality between the default path and detour path, in this first exemplary embodiment.

Figure 8:
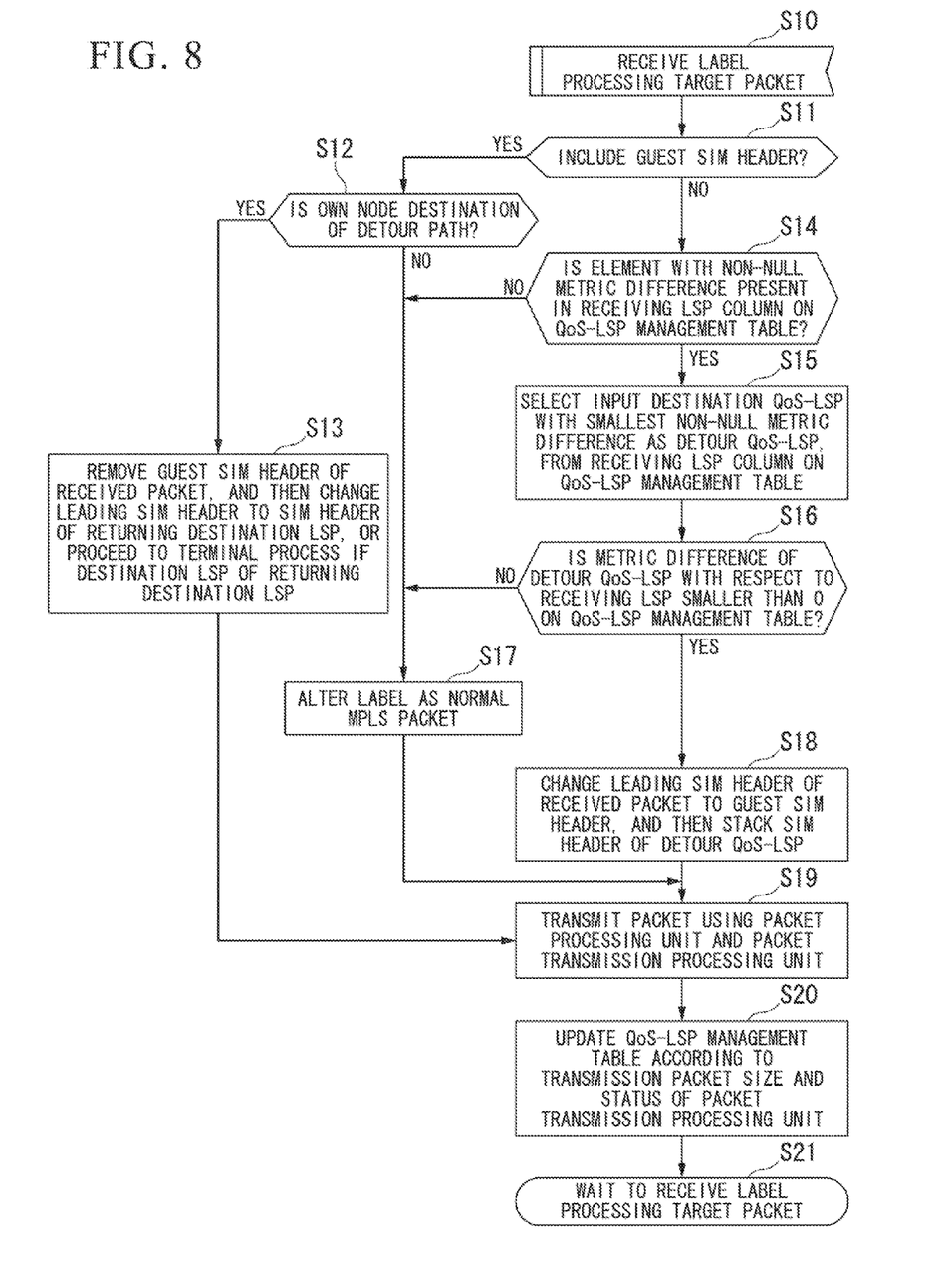
FIG. 8 is a flow chart for describing operations of a QoS-LSP unit, in which operations are integrated, according to the first exemplary embodiment of the present invention.

FIG. 8 is a flow chart for describing the operation of nodes LSR 101-7 and 101-9 described above, according to this first exemplary embodiment. When an input packet is received (step S10), the QoS-LSP selection unit 22 first inspects whether or not the input packet includes a guest SIM header (step S11). If no guest SIM header is included, it is inspected for whether or not detouring which satisfies the global condition is possible with another QoS-LSP, that is, whether or not there is any element of non-NULL metric difference in the receiving LSP column on the QoS-LSP management table 32 (step S14).

If detouring is possible, a QoS-LSP with the greatest metric merit is selected as a detour QoS-LSP (step S15), and it is inspected for whether or not the metric difference of the detour QoS-LSP with respect to the receiving LSP is negative on the QoS-LSP management table (step S16). If the merit is positive (metric difference is negative), the leading SIM header of the received packet is changed to a guest SIM header, and then a SIM header of the detour QoS-LSP is stacked thereon (step S18). Next, this received packet is transmitted as a guest packet by the packet processing unit 23 and the packet transmission processing unit 12 (step S19). Then, the QoS-LSP management table 32 (the metric difference therein) is updated according to the transmission packet size and the status of the packet transmission processing unit 12 (according to the result of local condition inspection) (step S20), and then, the process proceeds to wait for a label processing target packet to be received (step S21).

There are described other cases, that is, a case where detouring is determined as being impossible in step S14, and a case where the metric difference of the detour QoS-LSP with respect to the receiving LSP is not negative. In these types of cases, packets which do not include a guest SIM header all have their label altered so as to be treated as a normal MPLS packet (step S17). Next, this received packet is transmitted as a normal MPLS packet by the packet processing unit 23 and the packet transmission processing unit 12 (step S19). Then, the QoS-LSP management table 32 (the metric difference therein) is updated according to the transmission packet size and the status of the packet transmission processing unit 12 (according to the result of local condition inspection) (step S20), and then, the process proceeds to wait for a label processing target packet to be received (step S21).

On the other hand, in a case where the input packet includes a guest SIM header, it is inspected for whether the own node is the destination LSR of the detour path (step S12). If the own node is the destination LSR of the detour path, if the own node is the destination LSR of the default path LSP, the guest SIM header of the received packet is removed, and then, the leading SIM header is changed to the SIM header of the returning destination LSP, or a terminal process is performed if it is the destination LSP of the returning destination LSP (a process as an Egress node of MPLS is performed) (step S13).

On the other hand, if the own node is not the destination LSR of the detour path, the label is altered as a normal MPLS packet in order to process the input packet as a normal MPLS packet (step S17). Next, this received packet is transmitted as a normal MPLS packet by the packet processing unit 23 and the packet transmission processing unit 12 (step S19). Then, the QoS-LSP management table 32 (the metric difference therein) is updated according to the transmission packet size and the status of the packet transmission processing unit 12 (according to the result of local condition inspection) (step S20), and then, the process proceeds to wait for a label processing target packet to be received (step S21).

B. Second Exemplary Embodiment

Next, a second exemplary embodiment of the present invention is described.

The second exemplary embodiment of the present invention is intended for a wireless TDMA network.

Figure 9:
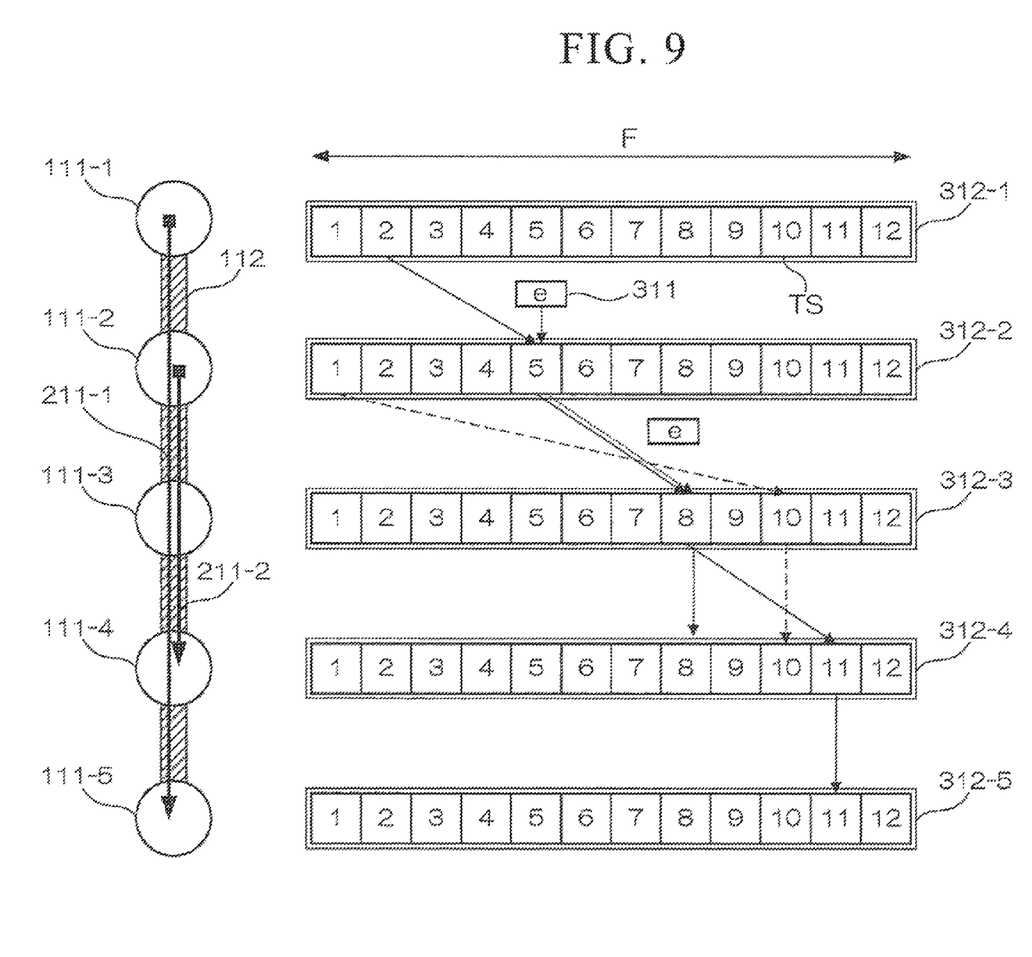
FIG. 9 is a conceptual diagram for describing an operation in a case of being applied to a multi-hop TDMA wireless network, according to a second exemplary embodiment of the present invention.

FIG. 9 is a conceptual diagram for describing an operation in a case of being applied to a multi-hop TDMA wireless network, according to the second exemplary embodiment of the present invention. FIG. 9 shows a multi-hop TDMA wireless network in which wireless nodes 111-1 through 111-5 are arranged linearly. In this example, explicit routing is performed by preliminarily assigning a transmission time slot at the point of origin and each relay node.

In FIG. 9, there are set QoS path 211-1 and QoS path 211-2. A QoS time slot TS assignment for each of the wireless nodes 111-1 through 111-5 is respectively shown in frames 312-1 through 312-5 (frame F). For the QoS path 211-1, slot "2" is assigned at node 111-1, slot "5" is assigned at node 111-2, slot "8" is assigned at node 111-3, and slot "11" is assigned at node 111-4. Since node 111-5 is a destination node, only data transmitted from node 111-4 is received at slot "11".

Similarly, for the QoS path 211-2, slot "1" is assigned at node 111-2, and slot "10" is assigned at node 111-3. When assigning a time slot to the QoS path 211-1 and QoS path 211-2, each node registers both of the QoS paths as a path which can perform the transmission process on behalf of each other. In the time slot, there is defined a flag field (guest flag) which becomes true when transmitting a guest packet.

Here, it is assumed that node 111-2 does not receive data in the slot "2" in a certain frame. At this time, it may be assumed that transmission of data of the QoS path 211-1 from node 111-1 next, is at or after the slot "2" of the next frame. At this time, if the QoS path 211-2 has data 311 waiting to be transmitted, by using the slot "5" to transmit this data (referred to as e), node 111-2 is able to estimate that the packet is received at the destination node 111-4 sooner than a case of waiting until the slot "1" of the next frame. Therefore, node 111-2 uses the slot "5" to transmit the data e, and at this time, the guest flag is turned to true.

Next, at the slot "5", node 111-3 which has received the data e from node 111-2 uses the slot "8" to transmit this as with the data of the QoS path 211-1. Finally, node 111-4 which has received the data e from node 111-3 at the slot "8" passes the received data as data of the QoS path 211-2 to a receiving application or upper level communication layer, since the guest flag is true and the own node is the destination node of the QoS path 211-2.

If, at the same frame as the above, node 111-2 has transmitted the data of the QoS path 211-2 at the slot "1", node 111-3 receives the data of the QoS path 211-2 at the slot "1" and slot "5". At this time, if the data received at the slot "1" is transmitted at the slot "8" and the data received at the slot "5" is transmitted at the slot "10", the order of receiving these packets at node 111-4 does not get inverted. Also at this time, the guest flag becomes true only when transmission is performed at the slot "8".

According to the second exemplary embodiment described above, although each QoS data is associated with a certain QoS path, by using another QoS path with a delay shorter than that of the QoS path, with which it is originally meant to be associated, it is possible to reduce the value of the expected delay. Moreover, by distributing the load between QoS paths capable of performing the transmission process on behalf of each other, it is possible to increase the expected value of the communication bandwidth.

C. Third Exemplary Embodiment

Next, a third exemplary embodiment of the present invention is described.

In this third exemplary embodiment, a detour path origin node, which performs selection of a detour path and default path of the present invention, is a mobile router including a plurality of wireless interfaces, and it is mounted with a process for executing wireless line multiplexing by means of an improved mobile inverse mux (MIM) disclosed in Reference B (Nakata, Noguchi, Nyu, Ukegawa, "Circuit Multiplexing Considering Diversification of Radio Technology for Mobile Internet System BBRide (registered trademark)", research paper B-6-33, The Institute of Electronics, Information and Communication Engineers Society Conference 2008).

Moreover, the line corresponding to one of the wireless interfaces of the mobile router provides a QoS guarantee service, and the wireless multiplexing protocol multiplexes a wireless line which does not use a QoS guarantee service. A wireless multiplexing system can provide probe information, performed internally, described in the above References A and B to a routing process for estimating transmission performance.

Figure 10:
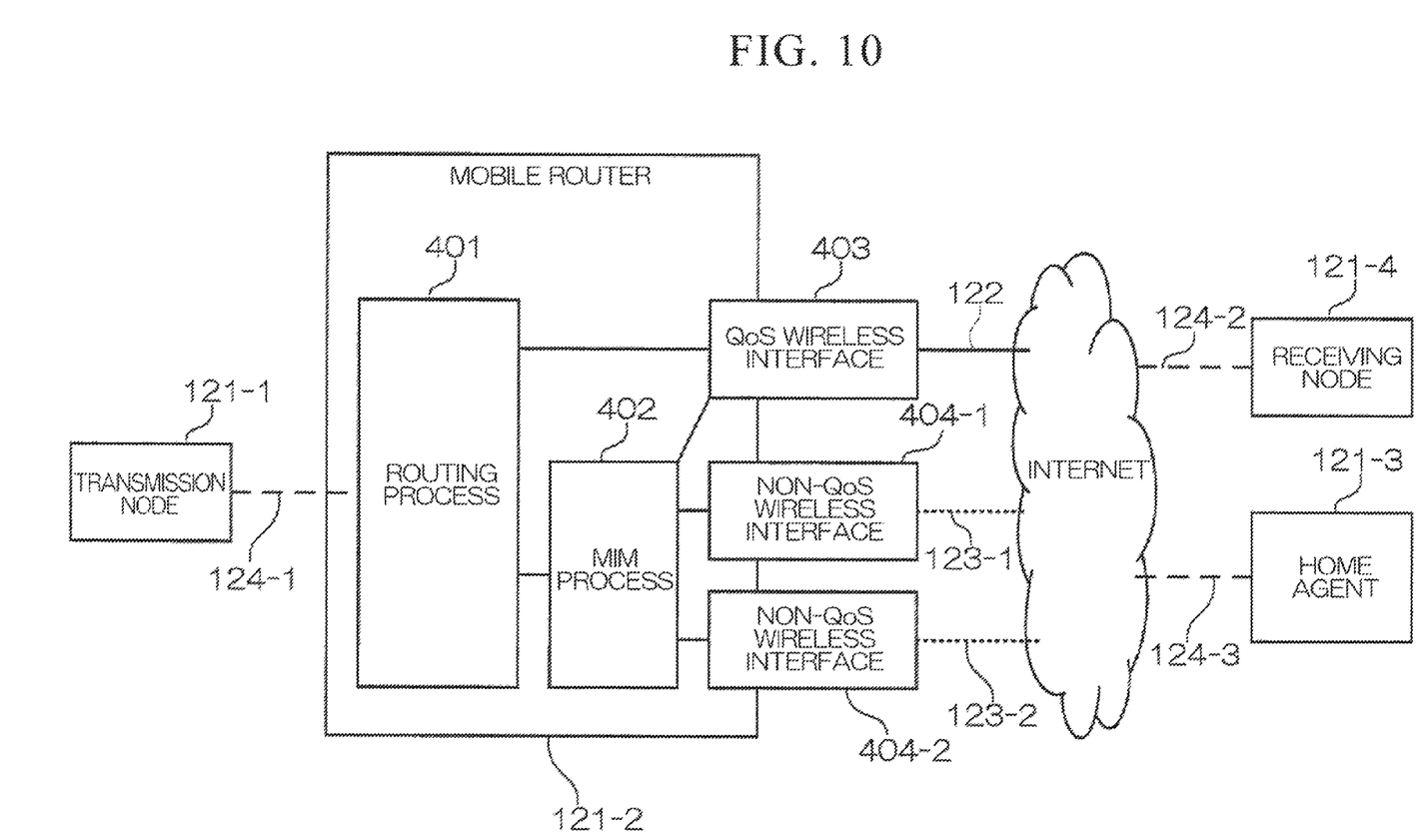
FIG. 10 is a block diagram showing a configuration of a communication system applied to a mobile router according to a third exemplary embodiment of the present invention.

FIG. 10 is a block diagram showing a configuration of a communication system applied to a mobile router, according to the third exemplary embodiment of the present invention. In FIG. 10, a transmission node 121-1 transmits a plurality of flows to a receiving node 121-4, and a portion thereof is a QoS flow.

It is assumed that the QoS flow is explicitly routed as the default path thereof, so that it is routed from a mobile router 121-2 through a QoS wireless interface 403 and a QoS wireless line 122.

A portion of the bandwidth of the QoS line 122 is reserved by the QoS flow, and it cannot be used by a MIM (mobile inverse mux) process 402. A routing process 401 routes IP packets other than the QoS flow to the MIM process 402. The routing process 401 estimates transmission quality in a case where a packet of the QoS flow is transmitted via MIM as with general IP packets, based on probe information provided by the MIM process 402 (refer to References A and B).

Furthermore, the routing process 401 compares this with the principle performance of the service provided by the QoS line 122 to thereby estimate the difference in transmission quality between the case of performing transmission with use of the default path and the case of performing transmission in IP routing, which takes the MIM process 402 as a detour path to serve as the next hop. In a case where the transmission quality of the detour path is higher than that of the default path at or above a certain probability, the routing process 401 transmits the flow of the QoS packet only from the detour path or from both of the detour path and default path, according to the packet loss tolerance of the QoS flow.

Use of IP routing, which takes the MIM process 402 as the next hop, as a detour path becomes meaningful in those cases where either one of non-QoS lines 123-1 and 123-2 can be used from the MIM process 402. In those cases where, due to the status of the wireless medium, communication restrictions, and service-stop of the home agent, a non-QoS wireless line cannot be used or where it becomes available for use, the status change is notified to the routing process 401. As a result, the routing process 401 is able to dynamically detect the presence/absence of a detour path.

If each wireless line is a public wireless line, a satellite line can be taken as an example of an actual line which is capable of providing a QoS guarantee service. Satellite lines are capable of bandwidth guarantee, however, they have a problem in that the minimum delay value is high. Therefore, the expected value of the transmission quality with mobile phone lines, which are not capable of a QoS guarantee, is more superior. In this type of case, if this third exemplary embodiment is applied to flows of voice communications, for which bandwidth guarantee is essential but which have a significant practical effect on delay reduction, there is an effect such that the expected value of delay can be improved while avoiding congestion.

According to the first to third exemplary embodiments described above, a QoS guarantee can be maintained by explicit routing, while a reduction in resource utilization efficiency caused by exclusive resource reservation can be suppressed in practical operations. Furthermore, it is possible to avoid limitations on the maximum bandwidth of the default path including QoS resources, and limitations on communication performance due to the minimum delay.

While the invention has been particularly shown and described with reference to exemplary embodiments thereof, the invention is not limited to these embodiments. It will be understood by those of ordinary skill in the art that various changes in form and details may be made therein without departing from the scope of the present invention.

This application is based upon and claims the benefit of priority from Japanese patent application No. 2009-079972, filed on Mar. 27, 2009, the disclosure of which is incorporated herein in its entirety by reference.

INDUSTRIAL APPLICABILITY

The present invention may be applied to a routing device, a communication system, and a routing method. According to these routing device, communications system, and routing method, it is possible to provide, to a flow with a default path defined by explicit routing, higher transmission performance than that of a default path according to the situation, and resources can be effectively reused.

REFERENCE SYMBOLS

11 Packet classification unit
12 Packet transmission processing unit
21 Label processing unit
22 QoS-LSP selection unit
23 Packet processing unit
31 Forwarding table
32 QoS-LSP management table
41 Bandwidth reservation processing unit
42 Resource status management table
101-1 to 101-14, 111-1 to 111-5 LSR
102, 112 Communication link
121-1 Transmission node
121-2 Mobile router
121-3 Home agent
121-4 Receiving node
201-1 to 201-4, 211-1, 211-2 LSP
301, 301-1, 301-2 Packet
311 Data
312-1 to 312-5 Frame
401 Routing process
402 MIM process
403 QoS wireless interface
404-1, 404-2 Non-QoS wireless interface

The invention claimed is:

1. A routing device, comprising:
a processor device; and
a memory device storing instructions that, when executed by the processor device, configure the processor device to:
connect to a network;
detect a first path in the network based on a first default path for trans n a first data flow and a second default path for transmitting a second data flow, wherein the first path includes at least a portion of the second default path to be used for transmitting at least a portion of the first data flow;
determine a first condition indicating whether a predetermined level of quality of service (QoS) at the routing device is maintained when the first data flow is at least partially transmitted through the first path;
determine a second condition indicating whether a second routing device located on a downstream side of the routing device is congested when the first data flow is at least partially transmitted through the first path;
estimate a first transmission quality of the first path, the first transmission quality indicating a QoS to be experienced by the first data flow when the first data is at least partially transmitted through the first path; and
route the first data flow to at least one of the first path and the first default path based on the first and second conditions and a difference between the first transmission quality and a second transmission quality of the first default path, the second transmitted quality indicating a QoS to be experienced by the first data flow when the first data flow is transmitted through the first default path.

2. The routing device according to claim 1, wherein the processor device is further configured to detect a region of the network shared between the routing device and at least one other routing device, in response to the first transmission quality exceeding a pre-determined threshold.

3. The routing device according to claim 1, wherein the processor device is further configured to detect the first path based on information indicative of a third transmission quality, wherein the third transmission quality indicates a QoS to be experienced by a third data flow when the third data flow is transmitted through at least a portion of the first default path.

4. The routing device according to claim 1, wherein the first path is a link between the routing device and the second routing device.

5. The routing device according to claim 1, wherein the second condition includes signaling information indicating that transmission of a packet from the routing device to a destination node does not use the first default path.

6. The routing device according to claim 1, wherein the processor device is further configured to determine a presence or an absence of a temporary link through which at least a portion of resources connected to the first default path are detoured by IP routing.

7. A communication system comprising:
a plurality of routing devices communicatively coupled to a communication network, wherein a routing device of the plurality of routing devices comprises:
a processor device;
a memory device storing instructions that, when executed by the processor device, configure the processor device to:
detect a first path in the network based on a first default path for transmitting a first data flow and a second default path for transmitting a second data flow, wherein the first path includes at least a portion of the second default path to be used for transmitting at least a portion of the first data flow;
determine a first condition indicating whether a predetermined level of quality of service (QoS) at the routing device is maintained when the first data flow is at least partially transmitted through the first path;
determine a second condition indicating whether a second routing device located on a downstream side of the routing device is congested when the first data flow is at least partially transmitted through the first path;
estimate a first transmission quality of the first path, the first transmission quality indicating a QoS to be experienced by the first data flow when the first data flow is at least partially transmitted through the first path; and
route the first data flow to at least one of the first path and the first default path based on the first and second conditions and a difference between the first transmission quality and a second transmission quality of the first default path, the second transmission quality indicating a QoS to be experienced by the first data flow when the first data flow is transmitted through the first default path.

8. The communication system according to claim 7, wherein the processor device is further configured to detect a region of the network shared between the routing device and at least one other routing device, in response to the first transmission quality exceeding a pre-determined threshold.

9. The communication system according to claim 7, wherein the processor device is further configured to detect the first path based on information indicative of a third transmission quality, wherein the third transmission quality indicates a QoS to be experienced by a third data flow when the third data flow is transmitted through at least a portion of the first default path.

10. The communication system according to claim 7, wherein the first path is a link between the routing device and the second routing device.

11. The communication system according to claim 7, wherein the second condition includes signaling information indicating that transmission of a packet from the routing device to a destination node does not use the first default path.

12. The communication system according to claim 7, wherein the processor device is further configured to determine a presence or an absence of a temporary link through which at least a portion of resources connected to the first default path are detoured by IP routing.

13. A routing method comprising:
 detecting, using at least one processor device, a first path in the network based on a first default path for transmitting a first data flow and a second default path for transmitting a second data flow, wherein the first path includes at least a portion of the second default path to be used for transmitting at least a portion of the first data flow;
 determining, using the at least one processor device, a first condition indicating Whether a predetermined level of quality of service (QoS) at the routing device is maintained when the first data flow is at least partially transmitted through the first path;
 determining, using the at least one processor device, a second condition indicating whether a second routing device located on a downstream side of the routing device is congested when the first data flow is at least partially transmitted through the first path;
 estimating, using the at least one processor device, a first transmission quality of the first path, the first transmission quality indicating a QoS to be experienced by the first data flow when the first data flow is at least partially transmitted through the first path; and
 routing, using the at least one processor device, the first data flow to at least one of the first path and the first default path based on the first and second conditions and a difference between the first transmission quality and a second transmission quality of the first default path, the second transmission quality indicating a QoS to be experienced by the first data flow when the first data flow is transmitted through the first default path.

14. The routing method according to claim 13, further comprising detecting, using the at least one processor device, a region of the network shared between the routing device and at least one other routing device, in response to the first transmission quality exceeding a pre-determined threshold.

15. The routing method according to claim 13, further comprising detecting, using the at least one processor device, the first path based on information indicative of a third transmission quality, wherein the third transmission quality indicates a QoS to be experienced by a third data flow when the third data flow is transmitted through at least a portion of the first default path.

16. The routing method according to claim 13, wherein the first path is a link between the routing device and the second routing device.

17. The routing method according to claim 13, wherein the second condition includes signaling information indicating that transmission of a packet from the routing device to a destination node does not use the first default path.

18. The routing method according to claim 13, further comprising determining, using the at least one processor device, a presence or an absence of a temporary link through which at least a portion of resources connected to the first default path are detoured by IP routing.

* * * * *